(12) United States Patent
Avoinne et al.

(10) Patent No.: US 9,910,799 B2
(45) Date of Patent: Mar. 6, 2018

(54) INTERCONNECT DISTRIBUTED VIRTUAL MEMORY (DVM) MESSAGE PREEMPTIVE RESPONDING

(71) Applicant: QUALCOMM Incorporated, San Diego, CA (US)

(72) Inventors: Christophe Avoinne, Campbell, CA (US); Jason Edward Podaima, Markham (CA); Manokanthan Somasundaram, Markham (CA); Bohuslav Rychlik, San Diego, CA (US); Thomas Zeng, San Diego, CA (US); Jaya Subramaniam Ganasan, Youngsville, NC (US); Kun Xu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 15/089,814

(22) Filed: Apr. 4, 2016

(65) Prior Publication Data

US 2017/0286335 A1    Oct. 5, 2017

(51) Int. Cl.
*G06F 13/00*  (2006.01)
*G06F 13/28*  (2006.01)
(Continued)

(52) U.S. Cl.
CPC ............ *G06F 13/28* (2013.01); *G06F 9/5016* (2013.01); *G06F 9/5077* (2013.01); *G06F 9/546* (2013.01);
(Continued)

(58) Field of Classification Search
CPC .............................. G06F 13/28; H04L 61/2015
See application file for complete search history.

(56) References Cited

U.S. PATENT DOCUMENTS 6,842,901 B1    1/2005  Miller
7,941,499 B2    5/2011  Bruce et al.
(Continued)

FOREIGN PATENT DOCUMENTS

| EP | 2930977 A1 | 10/2015 |
|---|---|---|
| WO | 2006085286 A1 | 8/2006 |
| WO | 2015158562 A1 | 10/2015 |

OTHER PUBLICATIONS

Wiener U., "Modeling and Analysis of a Cache Coherent Interconnect," Cambridge, The United Kingdom, v2.2, 2nd Aug. 2, 2012, 83 Pages.
(Continued)

*Primary Examiner* — Tammara Peyton
(74) *Attorney, Agent, or Firm* — The Marbury Law Group, PLLC

(57) ABSTRACT

Aspects include computing devices, apparatus, and methods for accelerating distributive virtual memory (DVM) message processing in a computing device. DVM message interceptors may be positioned in various locations within a DVM network of a computing device so that DVM messages may be intercepted before reaching certain DVM destinations. A DVM message interceptor may receive a broadcast DVM message from first DVM source. The DVM message interceptor may determine whether a preemptive DVM message response should be returned to the DVM source on behalf of the DVM destination. When certain criteria are met, the DVM message interceptor may generate a preemptive DVM message response to the broadcast DVM message, and send the preemptive DVM message response to the DVM source.

28 Claims, 8 Drawing Sheets

(51) Int. Cl.
*G06F 12/08* (2016.01)
*G06F 15/173* (2006.01)
*G06F 9/50* (2006.01)
*G06F 9/54* (2006.01)
*G06F 9/455* (2018.01)

(52) U.S. Cl.
CPC ........ *G06F 12/08* (2013.01); *G06F 15/17318* (2013.01); *G06F 2009/45583* (2013.01); *G06F 2212/657* (2013.01)

(56) References Cited

U.S. PATENT DOCUMENTS

| | | |
|---|---|---|
| 2001/0029519 A1 | 10/2001 | Hallinan et al. |
| 2008/0028071 A1* | 1/2008 | Miyajima ......... H04L 29/12028 709/224 |
| 2013/0318308 A1 | 11/2013 | Jayasimha et al. |
| 2015/0058463 A1 | 2/2015 | Wang et al. |
| 2015/0100753 A1 | 4/2015 | Shen et al. |
| 2015/0180824 A1 | 6/2015 | Atanasov |
| 2015/0186276 A1 | 7/2015 | Lepak et al. |
| 2015/0242319 A1 | 8/2015 | Evans et al. |
| 2017/0285705 A1* | 10/2017 | Podaima ................... G06F 1/10 |

OTHER PUBLICATIONS

Armando A., et al., "Breaking and Fixing the Android Launching Flow," Computers & Security, Mar. 31, 2013 (Mar. 31, 2013), vol. 39, pp. 104-115, XP028773721, ISSN: 0167-4048, DOI: 10.1016/J.COSE.2013.03.009.

International Search Report and Written Opinion—PCT/US2017/020402—ISA/EPO—Jun. 8, 2017.

Oh J-S., et al., "The Solution of Denial of Service Attack on Ordered Broadcast Intent," 16th International Conference on Advanced Communication Technology, Global IT Research Institute (GIRI), Feb. 16, 2014 (Feb. 16, 2014), pp. 397-400, XP032581320, DOI: 10.1109/ICACT.2014.6778989 [retrieved on Mar. 26, 2014].

\* cited by examiner

INTERCONNECT DISTRIBUTED VIRTUAL MEMORY (DVM) MESSAGE PREEMPTIVE RESPONDING

BACKGROUND

In a distributed virtual memory (DVM) system, such as used in Advanced RISC Machines (ARM) processors, DVM messages from a DVM source (e.g., a central processor unit (CPU)) are broadcast to all other DVM sources and to all DVM destinations (e.g., a system memory management unit (SMMU)). The DVM messages are distributed by a coherent interconnect and/or a DVM network, and such components gather responses from the DVM sources and destinations, merge the responses into a single response, and return a single response to the sending DVM source. Thus, the total response time for a DVM message is controlled by the slowest response.

SUMMARY

The methods and apparatuses of various aspects provide circuits and methods for distributive virtual memory (DVM) preemptive responding on a computing device. An aspect method may include receiving a DVM message broadcast from a first DVM source in a DVM message interceptor prior to delivery of the DVM message to a DVM destination, determining based on a content of the DVM message whether a preemptive DVM message response should be sent by the DVM message interceptor, generating the preemptive DVM message in response to determining that a preemptive DVM message response should be sent by the DVM message interceptor, and sending the preemptive DVM message response from the DVM message interceptor to the first DVM source.

Various aspects may include enabling the broadcast DVM message to reach the DVM destination in response to determining that a preemptive DVM message response should not be sent by the DVM message interceptor.

In some aspects, the DVM destination is a memory management unit and the DVM message interceptor is positioned within a DVM system to intercept the DVM message before the DVM message reaches the memory management unit.

Various aspects may include preventing the DVM destination from receiving the broadcast DVM message in response to determining that a preemptive DVM message response should be sent by the DVM message interceptor.

In some aspects, determining based on a content of the DVM message whether a preemptive DVM message response should be sent by the DVM message interceptor may include comparing data obtained from the broadcast DVM message with corresponding data in at least one of a white-list and a black-list, and determining whether a preemptive DVM message response should be sent by the DVM message interceptor based upon the comparison.

In some aspects, determining based on a content of the DVM message whether a preemptive DVM message response should be sent by the DVM message interceptor may include applying a mask to data obtained from the broadcast DVM message.

In some aspects, determining based on a content of the DVM message whether a preemptive DVM message response should be sent by the DVM message interceptor may include comparing data obtained from the broadcast DVM message with a criterion comprising at least one of a virtual memory identifier, a shared process context, a DVM operation, a memory translation stage identifier, and an execution level identifier.

Various aspects may include a distributive virtual memory (DVM) message interceptor configured for DVM preemptive responding. The DVM message interceptor may include a DVM communication interface, a preemption identifier, and a DVM message response generator respectively configured to perform operations of one or more of the embodiment methods summarized above.

Various aspects may include a distributive virtual memory (DVM) message interceptor configured for DVM preemptive responding having means for performing functions of one or more of the embodiment methods summarized above.

Various embodiments may include a non-transitory processor-readable storage medium having stored thereon processor-executable instructions configured to cause a processor of a distributive virtual memory (DVM) message interceptor to perform operations of one or more of the embodiment methods summarized above.

BRIEF DESCRIPTION OF THE DRAWINGS

The accompanying drawings, which are incorporated herein and constitute part of this specification, illustrate example aspects of various aspects, and together with the general description given above and the detailed description given below, serve to explain the features of the claims.

DETAILED DESCRIPTION

Figure 1:
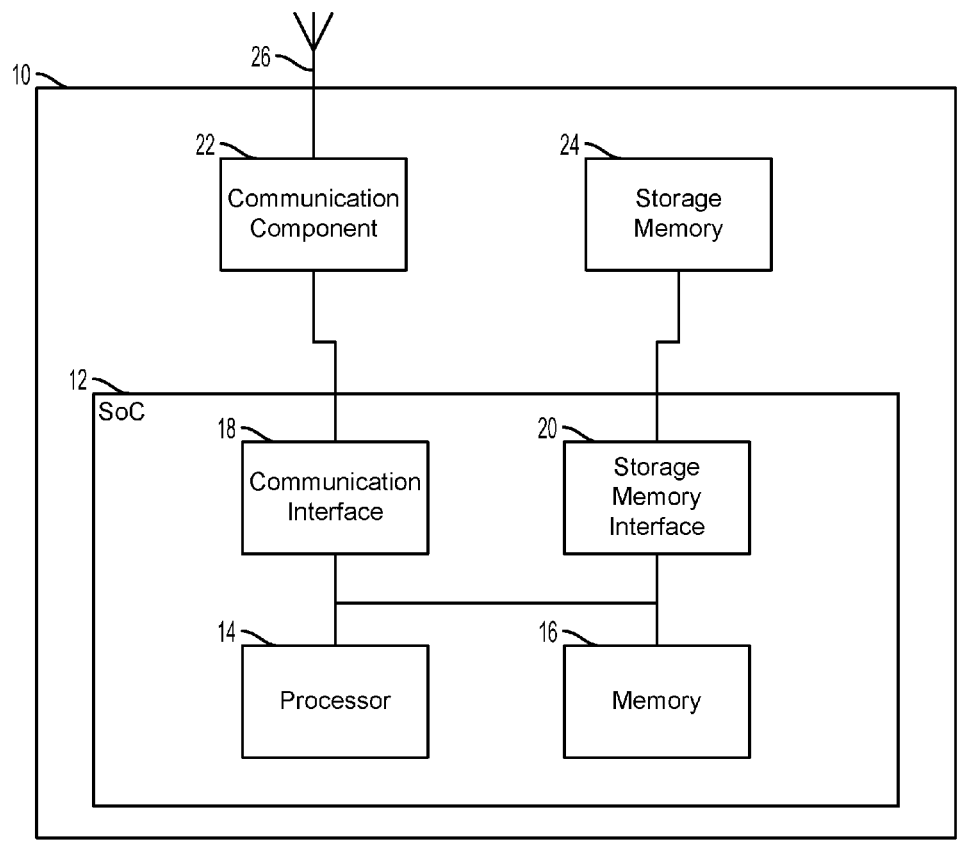
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and aspects are for illustrative purposes, and are not intended to limit the scope of the claims.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Various aspects include methods, and systems and devices for implementing one or multiple DVM message interceptors in the coherent interconnect or in an additional DVM network to shorten the average response time by providing a prompt response to DVM messages for DVM destinations that will not process or implement the particular type of DVM messages. Intercepting and responding on behalf of DVM destinations that will not process/implement certain DVM messages eliminates the lag in DVM signaling that would otherwise be incurred waiting for some DVM destinations to acknowledge irrelevant DVM messages.

In DVM systems, DVM sources and coherent interconnects typically run five to ten times faster than DVM networks and DVM destinations. The DVM messages broadcast by the DVM sources include messages for DVM operations. Such operations include translation lookaside buffer (TLB) invalidate, synchronization, instruction cache invalidate, branch predictor invalidate, and hint operations. Broadcasting the DVM messages sends the DVM messages to all DVM sources and destinations. However, broadcasting a DVM message to DVM sources and DVM destinations that are not intended to implement the DVM operation or that do not implement some of the DVM operation causes the system to wait for a response from those sources/destinations even though the DVM message is not relevant to those DVM sources/destination. Thus, broadcasting all DVM messages to all DVM sources/destinations creates situations in which time must be spent waiting for responses from unintended recipients of the DVM messages.

In various aspects, preemptively responding to DVM messages on behalf of DVM destinations for which the DVM messages are irrelevant through the use of DVM message interceptors improves the performance of DVM systems by reducing response times and/or power consumption. Such DVM message interceptors may be implemented along transmission paths and communication links in the coherent interconnect and/or the DVM networks at locations in the networks that enable DVM messages to be intercepted and acknowledged in behalf of downstream DVM destinations. The DVM message interceptors may generate an appropriate response upon matching a received DVM message to a preemptive response criterion. The DVM message interceptors may return the response to the associated coherent interconnect or DVM network for merging and/or returning to the source of the DVM message broadcast. To restate simply, the DVM message interceptors may terminate and respond to DVM messages before the messages reach a source or destination for which the message is not intended or of no consequence (i.e., irrelevant).

The DVM message interceptors may be circuits implementing various identification techniques and criteria that are positioned in various locations within a DVM system. Any number of DVM message interceptors may be used in a processor, system on chip (SoC) or computing device, and each DVM message interceptor may be configured to implement one or more identification techniques and criteria. The DVM message interceptors may be at placed on any transmission path downstream of a point of serialization in the DVM system. The DVM message interceptors may be software programmable or fixed configuration. Methods and criteria used to intercept DVM messages may trade off accuracy and performance. For example, to provide better accuracy in identifying irrelevant DVM messages at the expense of slower response times, white-list/black-list identification of DVM messages to be intercepted may be implemented in look-up tables that are accessed by a DVM message interceptor. As another example, mask/match structure identification may be used by DVM message interceptors to improve performance in terms of reaction time and/or power usage at the expense of limiting flexibility in terms of updates and/or the types of DVM messages that are intercepted.

The DVM message interceptors may implement any of a number of different types of DVM message identification/recognition as described herein.

The DVM message interceptors intercept broadcast DVM messages, and read destination and/or aspect data of the DVM messages in order to determine whether the data triggers preemption identification of the DVM messages. The DVM message interceptors may preemptively respond to those received DVM messages for which the destination and/or aspect data triggers preemption. In other words, in response to triggering preemption identification, the DVM message interceptors may generate an appropriate response to the DVM message (e.g., an acknowledgement of receipt by the corresponding DVM destination) and return the response to an upstream DVM interceptor associated with the DVM message interceptor. In some aspects, intercepted DVM messages may be terminated (i.e., not forwarded on to the DVM destination), but in some aspects intercepted DVM messages may be permitted to propagate to the DVM destination.

FIG. 1 illustrates a computing device 10 suitable for use with the various aspects. The computing device 10 may include a system-on-chip (SoC) 12 with a processor 14, a memory 16, a communication interface 18, and a storage memory interface 20. The computing device may further include a communication component 22 such as a wired or wireless modem, a storage memory 24, an antenna 26 for establishing a wireless communication link. The processor 14 may include any of a variety of hardware cores, for example a number of processor cores.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoCs 12, thereby increasing the number of processors 14 and processor cores. The computing device 10 may also include processors 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
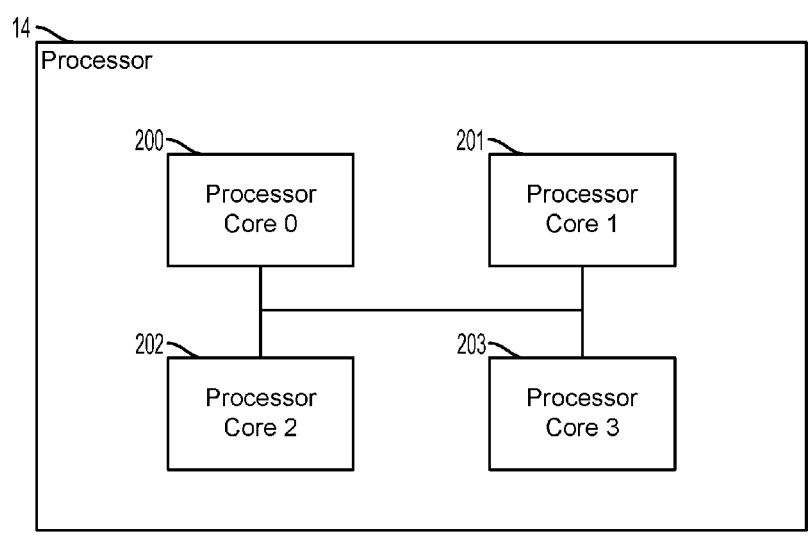
FIG. 2 is a component block diagram illustrating an example multi-core processor suitable for implementing an aspect.

FIG. 2 illustrates a multi-core processor 14 suitable for implementing an aspect. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big-.LITTLE" architectures in which slower, low-power processor cores may be coupled with more powerful and power-hungry processor cores. In similar aspects, the SoC 12 may include a number of homogeneous or heterogeneous processors 14.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various aspects to a four-core processor system. The computing device 10, the SoC 12, or the multi-core processor 14 may individually or in combination include fewer or more than the four processor cores 200, 201, 202, 203 illustrated and described herein.

Figure 3:
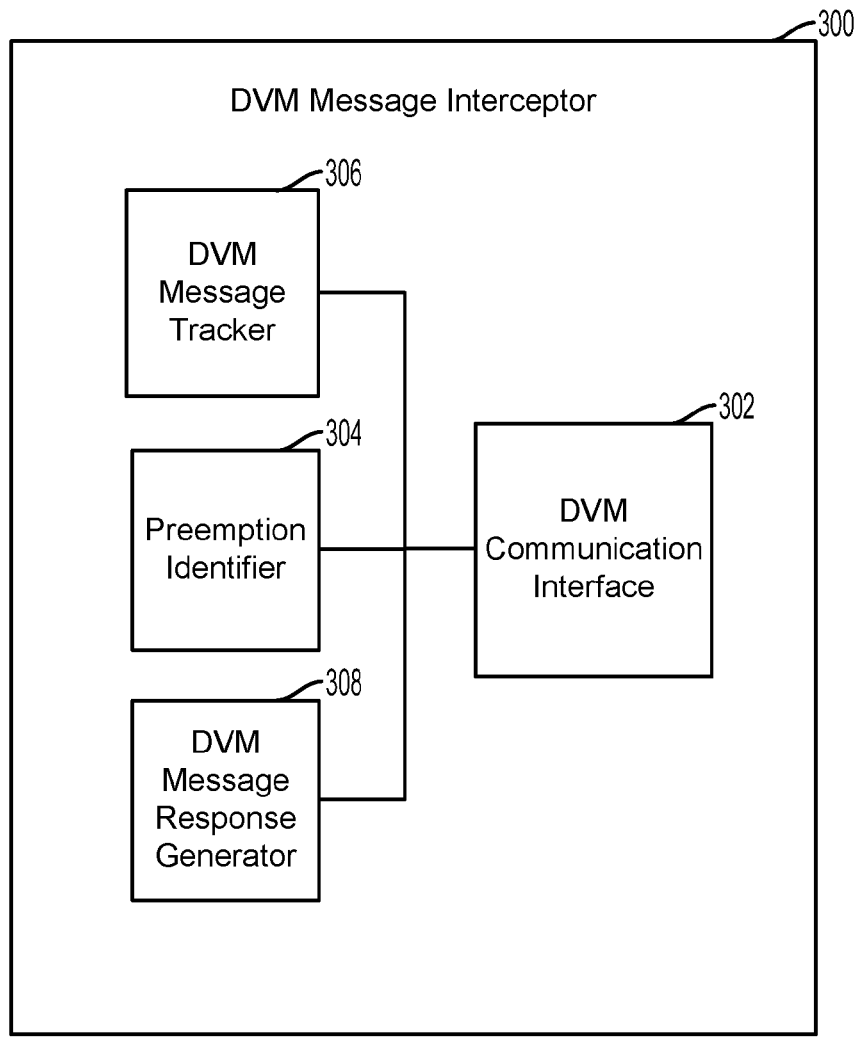
FIG. 3 is a component block illustrating an example distributed virtual memory message interceptor suitable for implementing an aspect.

FIG. 3 illustrates a non-limiting example of a DVM message interceptor 300 according to some aspects. The DVM message interceptor 300 may be implemented as a standalone hardware component (e.g., a circuit) of a computing device or as an integrated hardware component of an SoC of the computing device. The DVM message interceptor 300 may include a DVM communication interface 302, a preemption identifier 304, a DVM message tracker 306, and a DVM message response generator 308. The components of the DVM message interceptor 300 may be in electrical communication with each other. The DVM communication interface 302 may be configured to receive and send DVM messages, DVM broadcast responses, and preemptive responses to DVM messages. The DVM communication interface 302 may communicatively connect the DVM message interceptor 300 with other components of the computing device, including components of a DVM system, as described further herein with reference to FIG. 4.

The preemption identifier 304 may be configured to identify DVM messages that the DVM message interceptor 300 may terminate and to generate a preemptive responses to the DVM messages. The preemption identifier 304 may be configured to implement various techniques and response criteria to identify DVM messages permitted to proceed to the DVM destination, to identify DVM messages that are terminated, and/or to prompt the DVM message interceptor 300 to generate preemptive responses. The DVM message 300 interceptors may intercept broadcast DVM messages, and read destination and/or aspect data of the DVM messages used for determining whether the data triggers identification of the DVM messages for forwarding or terminating. The destination and/or aspect data of the DVM messages may also be used to generate the suitable response for preemptively responding to DVM messages that are terminated. The DVM message interceptor 300 and the preemption identifier 304 may be software programmable or a fixed configuration.

The various techniques and criteria that the preemption identifier 304 may be configured to implement for identifying broadcast DVM messages for termination and/or preemptive response may include white-list/black-list identification implementing look-up tables, and mask/match structure identification. The preemption identifier 304 may be configured for accuracy, performance, or a balance of accuracy and performance. White-list/black-list identification may be used for higher accuracy, and mask/match structure identification may be used for improved performance (speed and/or power usage) relative to each other.

White-list/black-list identification may use data obtained from the received broadcast DVM message to compare with data regarding the DVM destinations or sources downstream from the DVM message interceptor 300. In some aspects, the data of the DVM message may be read and compared to data in one or more lookup tables that contain either or both of a white-list containing data for matching with data of the DVM message that indicate to forward the DVM message, and a black-list containing data for matching with data of the DVM message that indicate to terminate the DVM message.

In some aspects, the data of the DVM message may be read and analyzed through mask/match structure identification. In such aspect, a mask relating to certain data of the DVM destinations/sources downstream from the DVM message interceptor 300 may be compared to the same type of data obtained from the DVM message to determine whether to forward the DVM message or to terminate and/or preemptively respond to the DVM message.

The preemption identifier 304 may be configured to implement any of the following techniques and criteria for white-list/black-list identification and mask/match structure identification.

Global identification may be used to terminate and/or preemptively respond to all DVM messages the DVM message interceptor 300 receives. Termination of all DVM messages may prevent the receipt of any DVM message by an associated DVM source or destination.

Virtual memory identifier (VMID) identification may be used to terminate and/or preemptively respond to all DVM messages without an approved VMID (e.g., white-list) or with an unapproved VMID (e.g., black-list). Termination of a DVM message without an approved VMID or with an unapproved VMID may prevent distribution of the broadcast DVM message to DVM destinations and sources associated with the DVM message interceptor 300 other than an intended recipient having a specified VMID.

Shared process context (ASID) identification may terminate and/or preemptively respond to all DVM messages without an approved ASID (e.g., white-list) or with an unapproved ASID (e.g., black-list). Termination of a DVM message without an approved ASID or with an unapproved ASID may prevent distribution of the broadcast DVM message to DVM destinations and sources associated with the DVM message interceptor 300 other than a recipient storing or using process context used by the broadcasting DVM source.

System memory management unit (SMMU) identification may terminate and/or preemptively respond to DVM messages for specific DVM operations. Termination of a DVM message for a specific DVM operation may prevent distribution of the broadcast DVM message to DVM destinations and sources associated with the DVM message interceptor 300 that may not handle or may ignore the DVM operation. For example, the DVM destinations may ignore instruction cache invalidate, branch predictor invalidate, and the hint operations, and the preemption identifier 304 may identify DVM messages for these DVM operations and terminate the DVM messages for downstream DVM destinations. The DVM destinations may implement translation lookaside buffer (TLB) invalidate and synchronize operations, and the preemption identifier 304 may identify DVM messages for these DVM operations and allow the DVM messages to be forwarded to downstream DVM destinations.

Synchronization identification may terminate and/or preemptively respond to DVM messages for unnecessary synchronization operations. Termination of unnecessary synchronization operations may prevent receipt of the DVM messages for synchronization operations if no TLB invalidate operation has been sent downstream after the last synchronization operation.

Stage identification may terminate and/or preemptively respond to DVM messages not targeting (e.g., white-list) or targeting (e.g., black-list) a memory translation stage (e.g., stage 1 or 2). Termination of DVM messages not targeting or targeting a memory translation stage may prevent receipt of the DVM messages targeting a memory translation stage other than an allowable memory translation stage.

Execution level (EL) identification may terminate and/or preemptively respond to DVM messages not targeting (e.g., white-list) or targeting (e.g., black-list) an execution level (e.g., Guest OS, Hypervisor, EL3). Termination of DVM messages not targeting or targeting an execution level may prevent receipt of the DVM messages targeting an execution level other than an allowable execution level.

In various aspects, multiple techniques and criteria may be used in combination to identify broadcast DVM messages to terminate and/or preemptively acknowledge. For example, SMMU identification of TLB invalidate operations may be implemented together with synchronization identification. As discussed further herein, a DVM message tracker 306 may track the status of broadcast DVM messages in relation to a next DVM node, which may include any of various downstream components of a DVM system, as described further herein with reference to FIG. 4, depending on the location of the DVM message interceptor 300. In some aspects, the DVM message tracker 306 may store the DVM operation of a broadcast DVM message, at least until a broadcast DVM message specifying synchronization operation is received. The preemption identifier 304 may use the information of the DVM message tracker 306 to determine whether a TLB invalidate operation has been issued since the last synchronization operation. In response to determining that no TLB invalidate operation has been issued since the last synchronization operation, the preemption identifier 304 may terminate and/or preemptively respond to a received broadcast DVM message specifying a synchronization operation.

In various aspects, the preemption identifier 304 may be configured with one or a combination of the identification techniques and criteria. In various aspects, the preemption identifier 304 may terminate and/or preemptively respond to a broadcast DVM message for the next DVM node downstream of the DVM message interceptor 300 according to the techniques and criteria with which the preemption identifier 304 is configured. In various aspects, for either or both DVM messages that are terminated and that are not terminated, the preemption identifier 304 may signal other components of the DVM message interceptor 300, including the DVM message tracker 306 and the DVM message response generator 308. The preemption identifier 304 may send a signal to the DVM message tracker 306 in response to terminating none, some, or all of the DVM messages for DVM destinations and sources downstream of the DVM message interceptor 300 indicating a state of the DVM message for each of the DVM destinations and sources. The preemption identifier 304 may send a signal to the DVM message response generator 306 in response to terminating a DVM message for all of the DVM destinations and sources downstream from the DVM message interceptor 300 indicating a ready state for sending a response message to the DVM message.

Either in response to receiving the signal from the preemption identifier 304 indicating termination or nontermination of a DVM message, or upon detecting termination or nontermination of the DVM message, the DVM message tracker 306 may update or store data indicating a status of the DVM message for the DVM destinations and sources downstream from the DVM message interceptor 300. The DVM message tracker 306 may correlate a status of each DVM message not yet responded to with the next DVM node associated with each DVM destination and source downstream from the DVM message interceptor 300.

The preemption identifier 304 or the DVM message tracker 306 may signal the DVM message interceptor 300 to forward (or not terminate) non-terminated DVM messages to the next DVM node associated with the DVM destinations and sources downstream from the DVM message interceptor 300 for which the DVM messages persist. The DVM message tracker 306 may track the status of the forwarded DVM messages, and update the status of the DVM message for each DVM destination and source downstream from the DVM message interceptor 300 in response to receiving a response message to the DVM message from the next DVM node associated with each DVM destination and source.

In response to receiving a response message, the DVM message tracker 306 may send a signal the DVM message response generator 308 indicating a ready state for sending a response message to the DVM message. In various aspects, the response message to the DVM message for each DVM destination and source may include an individual response message from one or more of the DVM destinations and sources, or a cumulative response message from a downstream DVM message interceptor 300, or a DVM coherent interconnect or DVM network component (not shown). In various aspects, for DVM messages that are terminated for all DVM destinations and sources downstream from the DVM message interceptor 300, the DVM message tracker 306 may send a signal to the DVM message response generator 308, instead of the signal sent from the preemption identifier 304 to the DVM message response generator 308 indicating a ready state for sending a response message to the DVM message.

In response to receiving the signal from the preemption identifier 304 or from the DVM message tracker 306 indicating a ready state for sending a response message to the DVM message, or upon detecting termination of the DVM message for all the DVM destinations and sources downstream from the DVM message interceptor 300, the DVM message response generator 308 may generate a DVM message response. The DVM message response may be a standard DVM message response or a preemptive DVM message response. The DVM message interceptor 300 may send the standard DVM message responses and the preemptive DVM message responses to a component of the computing device upstream of the DVM message interceptor 300.

A standard DVM message response may be generated in response to receiving the signal from the DVM message tracker 306 after receiving a response message to the DVM message for all of the DVM destination and source downstream from the DVM message interceptor 300. The standard DVM message response may be a cumulative DVM message response representing message responses for all of the DVM destination and source downstream from the DVM message interceptor 300.

A preemptive DVM message response may be generated after termination of the DVM message for all the DVM destinations and sources downstream from the DVM message interceptor 300 by the preemption identifier 304. The preemptive DVM message response may be a cumulative DVM message response representing message responses for all of the DVM destination and source downstream from the DVM message interceptor 300.

Figure 4:
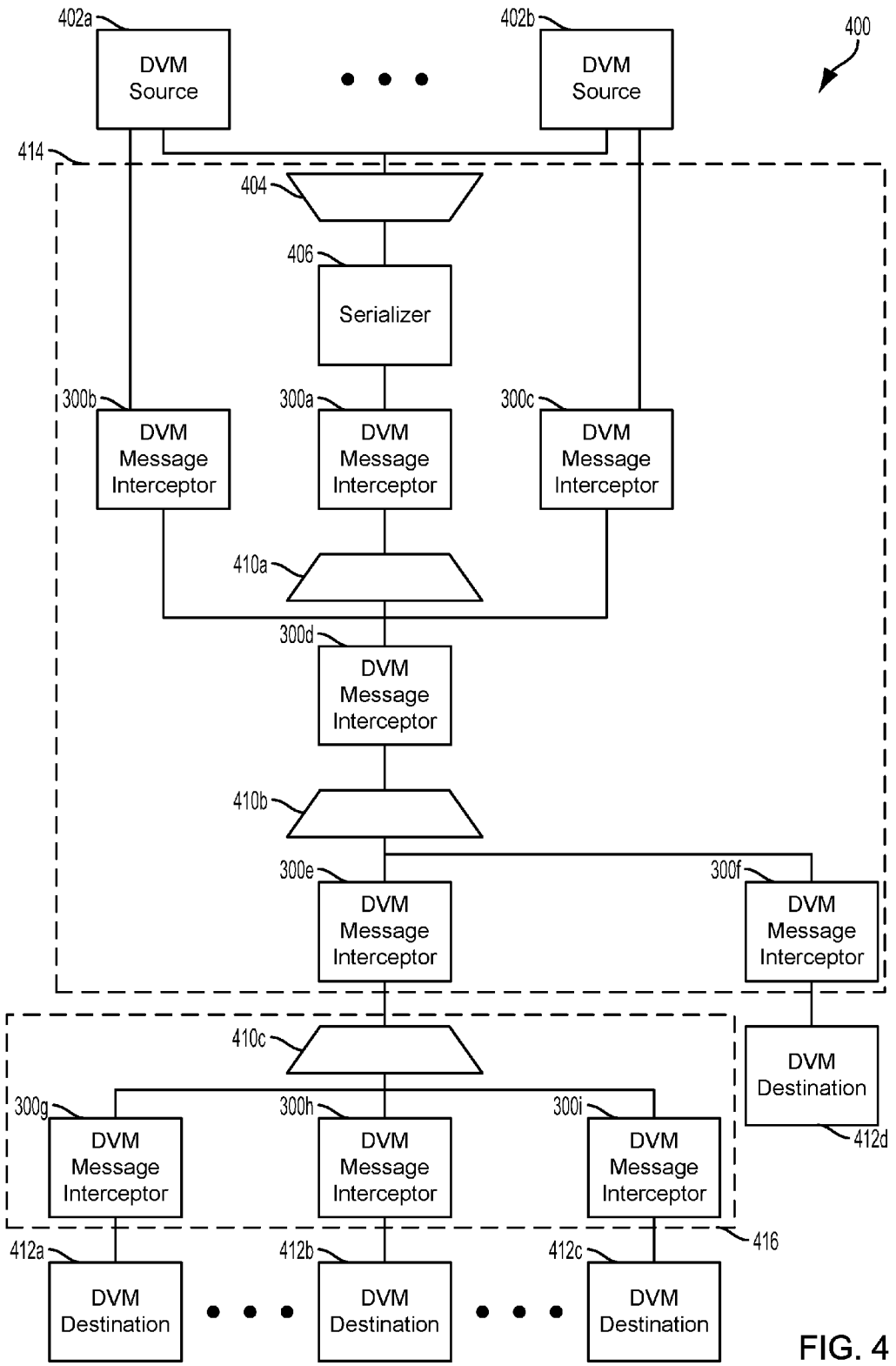
FIG. 4 is a component block diagram illustrating a distributed virtual memory system with distributed virtual memory message interceptors suitable for implementing an aspect.

FIG. 4 illustrates an example DVM system 400 with DVM message interceptors 300a-300i suitable for implementing some aspects. The DVM system may include any number of DVM sources 402a, 402b, a DVM coherent interconnect 414, one or more DVM networks 416, and any number of DVM destinations 412a-412d. The DVM coherent interconnect 414 may include an aggregator 404, a serializer 406, any number of broadcasters 410a, 410b, and any number of DVM message interceptors 300a-300f.

The DVM network 416 may include any number of broadcasters 410c and any number of DVM message interceptors 300g-300i. The DVM sources 402a, 402b may include any processing device or hardware core as described herein, such as the processor 14 described with reference to FIGS. 1 and 2. The of DVM destinations 412a-412d may include memory management units, such as system memory management units, configured to control access to and implement functions for memory devices, such as the memory 16 described with reference to FIG. 1.

The DVM sources 402a, 402b may be configured to broadcast DVM messages having various data for implementing DVM operations, including various combinations of a type of DVM operation (or opcode that may include translation lookaside buffer invalidate (TLBI), synchronization (SYNC), L1I invalidation, hint, etc.), an attached or associated VMID for an intended recipient DVM sources 402a, 402b or DVM destinations 412a-412d, an attached or associated ASID for the execution of the DVM operation, a memory translation stage for the execution of the DVM operations, and an execution level for the execution of the DVM operations. The DVM sources 402a, 402b may also receive standard DVM message responses and preemptive DVM message responses. The DVM sources 402a, 402b may broadcast the DVM messages to other DVM sources 402a, 402b and/or to DVM destinations 412a-412d via the DVM coherent interconnect 414 and the one or more DVM networks 416. The DVM sources 402a, 402b may also receive standard DVM message responses and preemptive DVM message responses via the DVM coherent interconnect 414 and the one or more DVM networks 416 in response to a sent DVM message.

The DVM coherent interconnect 414 may be configured to receive and broadcast the DVM messages from the DVM sources 402a, 402b, to receive, from the DVM sources 402a, 402b and the DVM destinations 412a-412d, the standard DVM message responses and preemptive DVM message responses, and to send the DVM message responses to the DVM sources 402a, 402b that sent the DVM messages.

The aggregator 404 may be configured to receive the DVM messages from the sending DVM sources 402a, 402b, send the DVM messages to the serializer 406, receive the DVM responses from the serializer 406, and send the DVM responses to the sending DVM sources 402a, 402b.

The DVM serializer 406 may be configured to receive the DVM messages from the aggregator 404, and to convert the DVM messages from a parallel format to a serial format for sending through the DVM coherent interconnect 414 and the DVM networks 416. The DVM serializer 406 may be configured to receive the DVM messages responses from the broadcaster 410a, and establish a global order among the various coherent masters of the coherent interconnect 414.

The DVM message interceptors 300a-300f may be configured to receive the DVM messages from the serializer 406, other DVM message interceptors 300a-300i, and the broadcasters 410a-410c, and to forward or enable transmission of the DVM messages to the other DVM sources 402a, 402b and the DVM destinations 412a-412d, in some aspects via the broadcasters 410a-410c and other DVM message interceptors 300a-300i. The DVM message interceptors 300a-300f may receive the DVM message responses from the other DVM sources 402a, 402b and the DVM destinations 412a-412d, in some aspects via the broadcasters 410a-410c and other DVM message interceptors 300a-300i. In various aspects, DVM nodes upstream and downstream from any DVM message interceptor 300a-300i may include another DVM message interceptor 300a-300i and/or a broadcaster 410a-410c.

In various aspects, DVM nodes downstream from any DVM message interceptor 300a-300i may also include a DVM source 402a, 402b or a DVM destination 412a-412d. DVM nodes including a downstream DVM source 402a, 402b or DVM destination 412a-412d may be identified as a last level DVM node. Any DVM nodes downstream from a DVM message interceptor 300a-300i, including last level DVM nodes, may be identified as a next DVM node or next level DVM node.

The DVM message interceptors 300a-300f may send a standard DVM message response, representing a DVM message response from each of the downstream next DVM nodes, to the sending DVM source 410a, 410b via the serializer 406, and in some aspects also via the broadcasters 410a-410c and other DVM message interceptors 300a-300i.

The broadcasters 410a, 410b may be configured to receive the DVM messages from the serializer 406, the DVM message interceptors 300a-300i, and other broadcasters 410a-410c, and to broadcast the DVM messages to the other DVM sources 402a, 402b and the DVM destinations 412a-412d via other broadcasters 410a-410c and other DVM message interceptors 300a-300i. The broadcasters 410a, 410b may be configured receive the DVM response messages from the other broadcasters 410a-410c and other DVM message interceptors 300a-300i, and to send the DVM response messages to the serializer 406, the DVM message interceptors 300a-300i, and other broadcasters 410a-410c from which the broadcasters 410a-410c received the DVM messages.

In various aspects, the configuration of the various components of the DVM coherent interconnect 414 may include additional or fewer components. In various aspects, whether a DVM message or DVM response message is sent to or received from another component may depend on the configuration of the DVM coherent interconnect 414. For example, the broadcaster 410b a may receive a DVM message directly from the serializer 406, directly from the DVM message interceptor 300a or 300b, or directly from the broadcaster 410a depending on which of the components are implemented in the DVM coherent interconnect 414.

The one or more DVM networks 416 may be configured to receive and broadcast the DVM messages from the DVM sources 402a, 402b via the DVM coherent interconnect 414, and to receive the standard DVM message responses and preemptive DVM message responses from the DVM sources 402a, 402b and the DVM destinations 412a-412d. The one or more DVM networks 416 may be configured to send the DVM message responses to the DVM sources 402a, 402b that sent the DVM messages via the DVM coherent interconnect 414. The broadcaster 410c and the DVM message interceptors 300g-300i may be configured in a similar manner to the broadcasters 410a and 410b, and the DVM message interceptors 300a-300f, respectively, as described herein with respect to the DVM coherent interconnect 414.

In various aspects, the configuration of the various components of the one or more DVM networks 416 may include additional or fewer components. In various aspects, whether a DVM message or DVM response message is sent to or received from another component may depend on the configuration of the one or more DVM networks 416.

The DVM sources 410a, 410b and the DVM destinations 412a-412d may be configured to receive the DVM messages via the DVM coherent interconnect 414 and the one or more DVM networks 416. The DVM sources 410a, 410b and the DVM destinations 412a-412d may be configured to respond to receiving the DVM messages by implementing a DVM operation and sending a DVM response message, ignoring the DVM message, or responding to the DVM message with a DVM response message without implementing the DVM operation.

Figure 5A:
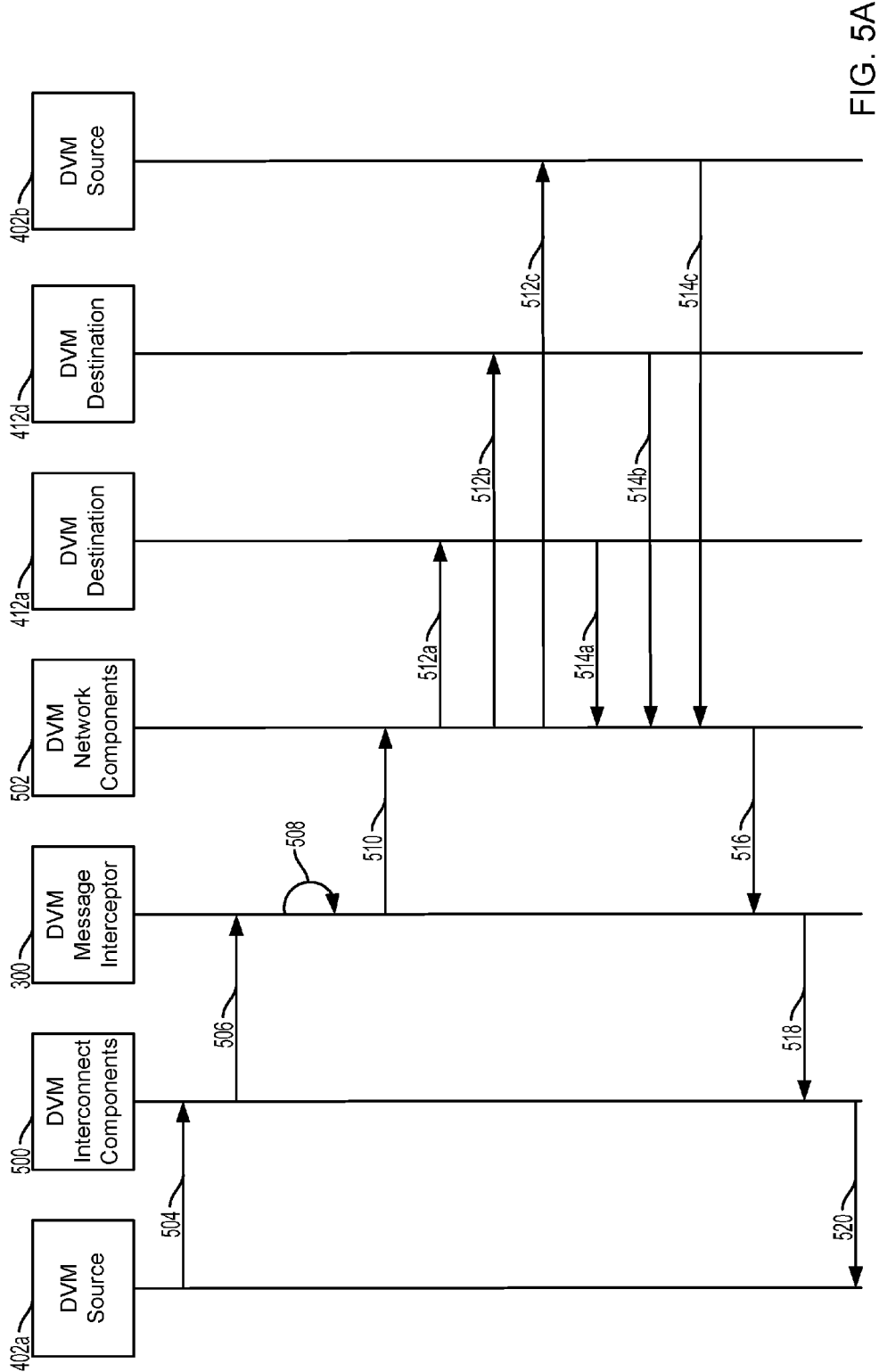
FIGS. 5A and 5B are signaling diagrams illustrating an example of distributed virtual memory preemptive responding according to an aspect.
Figure 5B:
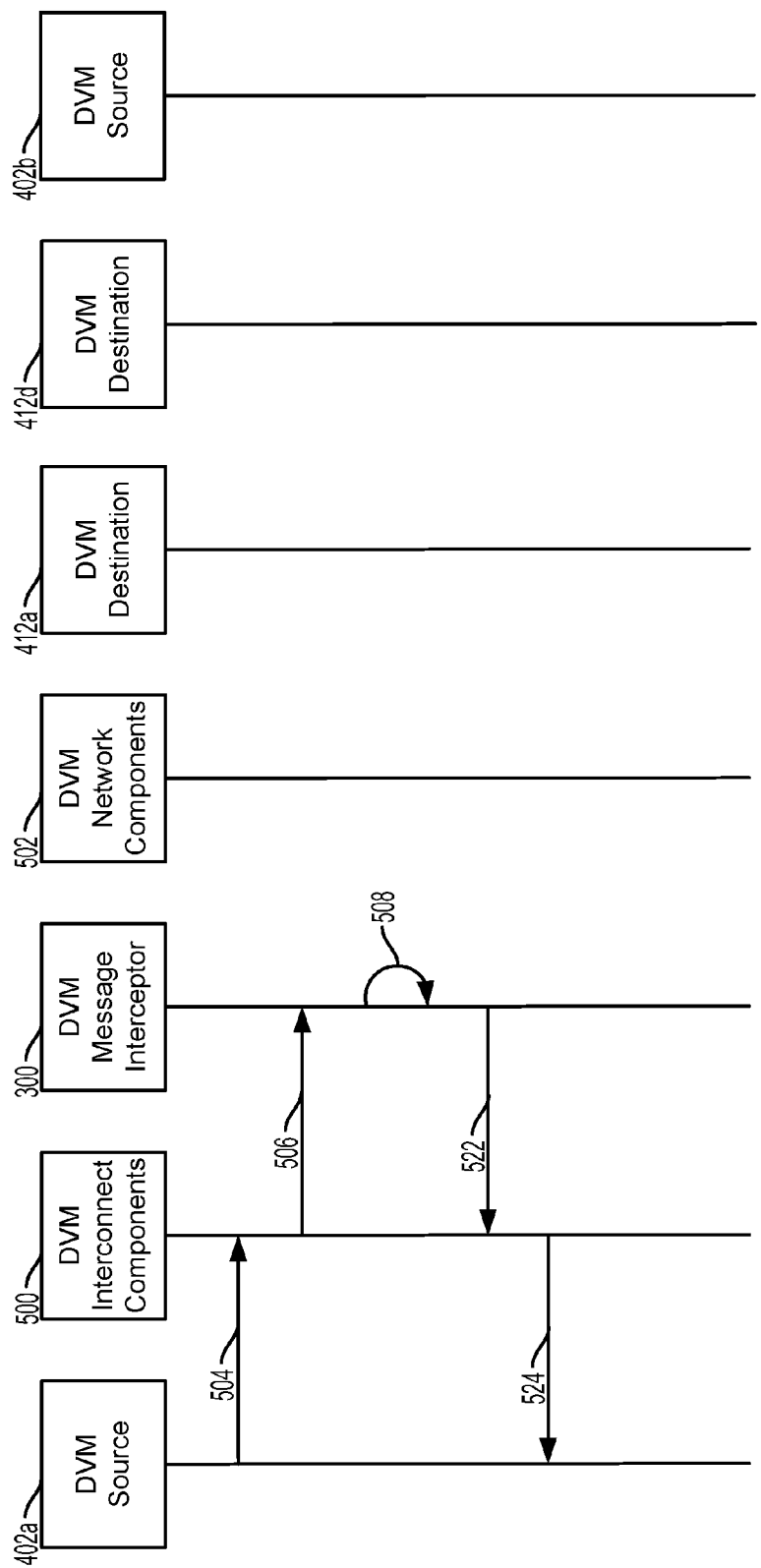

FIGS. 5A and 5B illustrate examples of signaling involved in distributed virtual memory preemptive responding according to various aspects.

Referring to FIG. 5A, a DVM source 402a may issue a DVM message 504. Components of the DVM coherent interconnect 500, including one or more of the aggregator 404, the serializer 406, and the broadcasters 410a, 410b for the DVM coherent interconnect 414 described with reference to FIG. 4, may receive the DVM message. Depending on the components of the DVM coherent interconnect 500 receiving the DVM message, operations may be implemented to serialize or broadcast the DVM message.

The components of the DVM coherent interconnect 500 may send the DVM message 506, and the DVM message may be received by a DVM message interceptor 300, as described herein with reference to FIGS. 3 and 4. The DVM message interceptor 300 may be configured to analyze data of the DVM message 508 to identify whether to forward the DVM message or to respond to the DVM message with a preemptive DVM response. In the example illustrated in FIG. 5A, the DVM message interceptor 300 determines that the DVM message 510 should be delivered (e.g., forwarded or allowed to continue) to the DVM destination(s) and/or source(s) downstream of the DVM message interceptor 300. Components of the DVM network 502, including the broadcaster 410c and the DVM message interceptors 300g-300i, as described herein with reference to FIG. 4, may receive the forwarded DVM message. Depending on the components of the DVM network 502 receiving the DVM message, operations may be implemented to broadcast or analyze the data of the DVM message. The components of the DVM network 502 may forward the DVM message 512a, 512b, 512c to one or more DVM destinations 412a, 412d and DVM source 402b.

A DVM destination 412a, 412d or DVM source 402b (e.g., described herein with reference to FIG. 4) may receive the forwarded DVM message 512a, 512b, 512c. In some aspects, the DVM destination 412a, 412d or DVM source 402b may implement a DVM operation designated by the DVM message, and generate and send back a DVM response message 514a, 514b, 514c. In some aspects, the DVM destination 412a, 412b may ignore the DVM message and send back the DVM response message 514a, 514b. The DVM network components 502, including the broadcaster, may receive the DVM response messages 514a, 514b, 514c, aggregate or merge the DVM response messages 514a, 514b, 514c, and send a DVM response message 516 for one or more DVM destinations 412a, 412b or DVM sources 402b. In aspects forwarding multiple DVM messages 512a, 512b, 514c, to one or more DVM destinations 412a, 412d or DVM sources 402b, the DVM network components 502 may wait until receiving all the DVM response messages 514a, 514b, 514c before sending the DVM response message 516.

In some aspects, the DVM response message may be a standard DVM response message generated by a DVM message interceptor 300g-300i. In some aspects, rather than the DVM network components 502 receiving the forwarded DVM message, the forwarded DVM message may be received directly by the issuing DVM destination 402a. The DVM destination may send the DVM response message directly to the DVM message interceptor 300.

The DVM message interceptor 300 may generate and send a standard DVM message response 518, representing a DVM message response 514a, 514b, 514c from each of the downstream DVM sources 402b and DVM destinations 412a, 412d, for example aggregated DVM response 516. The DVM message interceptor 300 may generate the standard DVM message response in response 518 to receiving the DVM response message 514a, 514b, 514c. The DVM coherent interconnect components 500 may receive the standard DVM message response 518. In some aspects, the DVM coherent interconnect components 500 may forward the standard DVM message response 520 to the issuing DVM source 402a.

In the example illustrated in FIG. 5B, the DVM message interceptor 300 determines that a preemptive DVM response message should be generated in response to the DVM message 506, and sends the preemptive response message 522. The determination made to generate and send the preemptive DVM response message may be based on the identification techniques and criteria as described herein with reference to FIG. 3. The DVM coherent interconnect components 500 may receive the preemptive DVM response message, and forward the preemptive DVM response message 524 to the issuing DVM source 402a.

Figure 6:
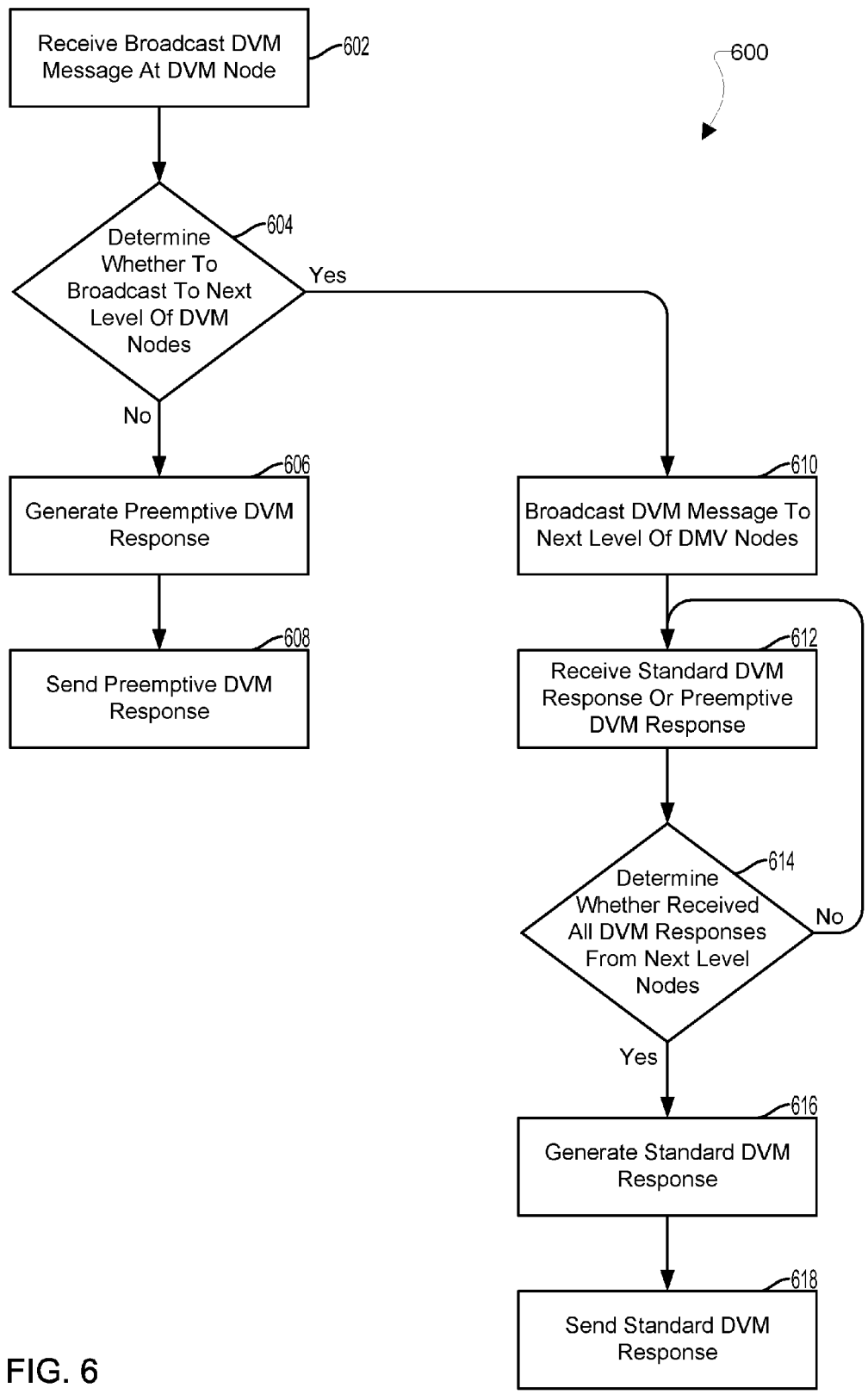
FIG. 6 is a process flow diagram illustrating a method for implementing distributed virtual memory preemptive responding according to an aspect.

FIG. 6 illustrates an example method 600 for implementing DVM preemptive responding according to various aspects. The method 600 may be implemented in a DVM interceptor (e.g., the DVM message interceptor 300 in FIGS. 3, 4, 5A, and 5B) which may be implemented in a processor executing software implementing the method 600, in general purpose hardware/circuitry, in dedicated hardware/circuitry, or in a combination of a processor and dedicated hardware. In order to encompass the alternative configurations enabled in the various aspects, the hardware implementing the method 600 is referred to herein as a "DVM interceptor."

In block 602, the DVM interceptor may receive a broadcast DVM message. In determination block 604, the DVM interceptor may determine whether to broadcast the DVM message to the next level of DVM nodes. Next level DVM nodes may include other DVM interceptors, DVM network components, such as broadcasters, DVM destinations, and DVM sources depending on the location of the DVM interceptor. As described herein with reference to FIG. 3, the DVM interceptor may use one or more techniques and criteria in identifying broadcast DVM messages to broadcast to the next level of DVM nodes or to respond to with a preemptive DVM message response. In various aspects, determining whether to broadcast the broadcast DVM message or generate and sent a preemptive DVM message response may depend on data of the broadcast DVM response compared with white-list/black-list data or mask/match structure identification analysis. The bases for the comparison or analysis may include any one or combination of broadcast DVM message, VMID, ASID, specific DVM operations, synchronization operations, target translation stages, and target execution level stages. The determination of whether to broadcast the broadcast DVM message or to generate and send a preemptive DVM message response may be made for each DVM destination or source downstream from the component of the DVM interceptor making the determination.

In response to determining not to broadcast the broadcast DVM message to the next level of DVM nodes (i.e., determination block 604="No"), the DVM interceptor may generate a preemptive DVM message response message in block 606. The preemptive DVM response message may represent a response for all of the DVM destinations and sources downstream from the component of the DVM interceptor making the determination. In block 608, the DVM interceptor may send the preemptive DVM message response to a component of the DVM system upstream of the component of the DVM interceptor making the determination, including a previous level DVM node.

In response to determining that to the broadcast DVM message should be broadcast to the next level of DVM nodes (i.e., determination block 604="Yes"), the DVM interceptor may forward (or enable transmission of) the broadcast DVM message to the next level DVM nodes downstream from the component of the DVM interceptor making the determination in block 610. As described herein, the determination of whether to broadcast the broadcast DVM message or to generate and send a preemptive DVM message response to the broadcast DVM message may be made for each DVM destination or source downstream from the component of the DVM interceptor making the determination. Therefore, the DVM interceptor may forward the broadcast DVM message to the next level DVM nodes downstream from the component of the DVM interceptor making the determination depending on the determination for each DVM destination or source. In various aspects, a determination to broadcast the broadcast DVM message to a single downstream DVM destination or source may trigger the determination to broadcast the broadcast DVM message to some or all of the next level DVM nodes.

In block 612, the DVM interceptor may receive a standard DVM message response or a preemptive DVM message response. The standard DVM message response or a preemptive DVM message response may be received from a next level DVM node, including a DVM destination or source, a DVM message interceptor, or a broadcaster, downstream from the component of the DVM interceptor making the determination.

In determination block 614, the DVM interceptor may determine whether all DVM message responses are received from the next level DVM nodes or final destinations, last level DVM nodes, downstream from the component of the DVM interceptor making the determination. As described herein, the standard DVM message response and the preemptive DVM message response may be cumulative DVM message responses for multiple downstream DVM destinations or sources sent by and received from a next level DVM node. Therefore, receiving a single standard DVM message response and a preemptive DVM message response may represent receiving a response for one or more downstream DVM destinations or sources. In various aspects, a standard DVM message response or a preemptive DVM message response representing multiple downstream DVM destinations or sources may originate from a next level DVM node, including a DVM message interceptor or a broadcaster. In various aspects, a standard DVM message response representing a single downstream DVM destination or source may originate from a next level DVM node or last level DVM node, including the downstream DVM destination or source. The DVM interceptor may track the status of the broadcast DVM message in relation to each next level DVM node downstream from the component of the DVM interceptor making the determination, and use the tracking data to determine, in determination block 614, whether the status of the broadcast DVM message indicates that the response DVM message is received from any next level DVM node downstream from the component of the DVM interceptor making the determination.

In response to determining that not all DVM message responses are received for all DVM destinations or source downstream from the component of the DVM interceptor making the determination (i.e., determination block 614="No"), the DVM interceptor may receive more standard DVM message responses or preemptive DVM message responses in block 612.

In response to determining that all DVM message responses are received for all DVM destinations or source downstream from the component of the DVM interceptor making the determination (i.e., determination block 614="Yes"), the DVM interceptor may generate a standard DVM message response in block 616. The generated standard DVM message response may represent a DVM message response for all DVM destinations or source downstream from the component of the DVM interceptor making the determination.

In block 618, the DVM interceptor may send the standard DVM message response to a component of the DVM system upstream of the component of the DVM interceptor making the determination.

Figure 7:
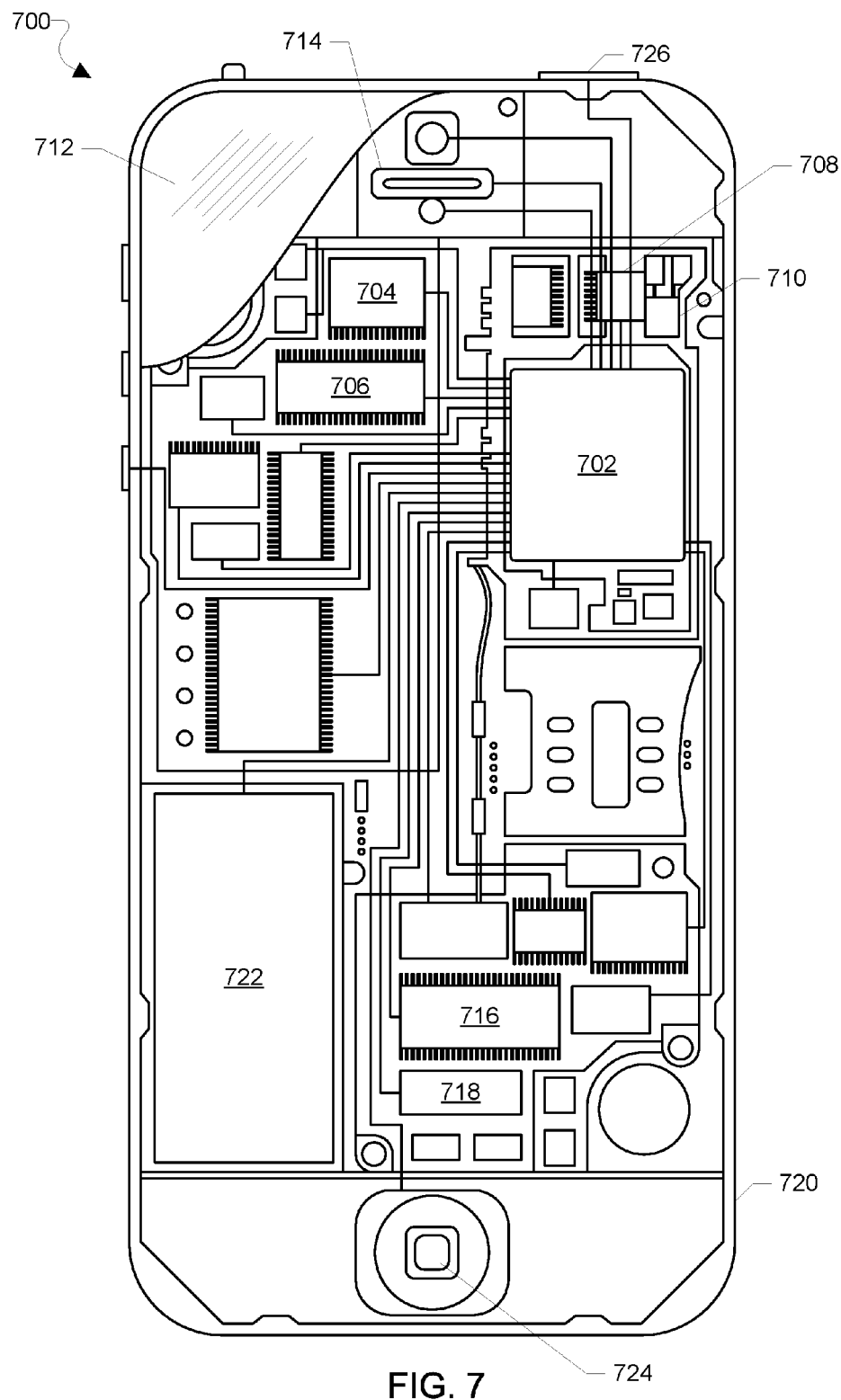
FIG. 7 is a component block diagram illustrating an example mobile computing device suitable for use with the various aspects.

The various aspects (including, but not limited to, aspects described above with reference to FIGS. 1-6) may be implemented in a wide variety of computing systems including mobile computing devices, an example of which suitable for use with the various aspects is illustrated in FIG. 7. The mobile computing device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM.

The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the computing device 700 need not have touch screen capability.

The mobile computing device 700 may have one or more radio signal transceivers 708 (e.g., Peanut, Bluetooth, Zigbee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as Universal Serial Bus (USB), FireWire, Thunderbolt, or PCIe. The peripheral device connection interface 718 may also be coupled to a similarly configured peripheral device connection port (not shown).

The mobile computing device 700 may also include speakers 714 for providing audio outputs. The mobile computing device 700 may also include a housing 720, constructed of a plastic, metal, or a combination of materials, for containing all or some of the components described herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

Figure 8:
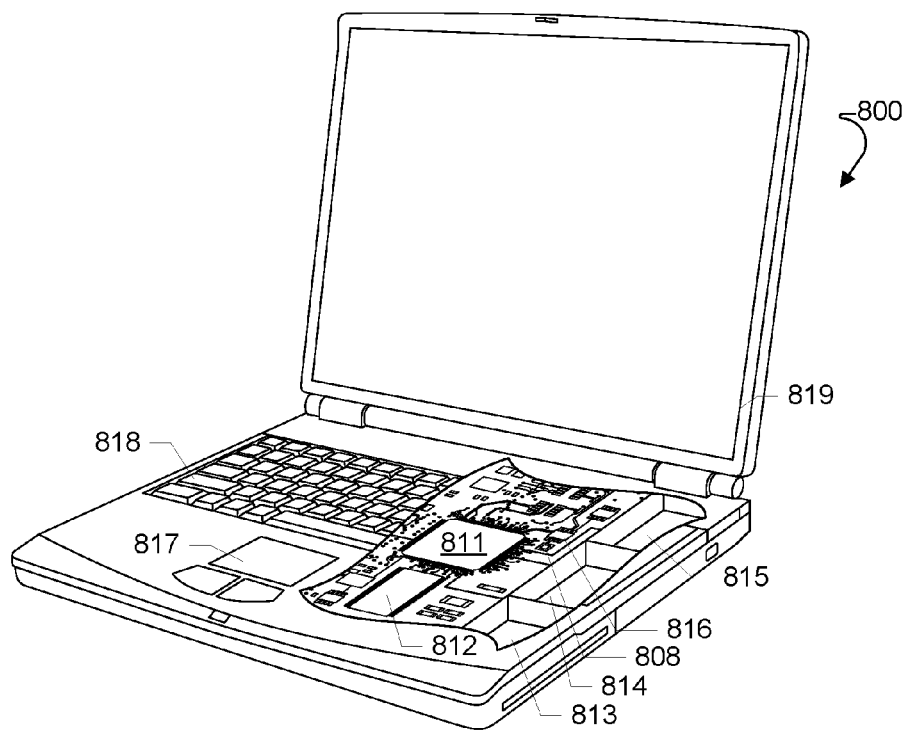
FIG. 8 is component block diagram illustrating an example mobile computing device suitable for use with the various aspects.

The various aspects (including, but not limited to, aspects described above with reference to FIGS. 1-6) may be implemented in a wide variety of computing systems include a laptop computer 800 an example of which is illustrated in FIG. 8. Many laptop computers include a touchpad touch surface 817 that serves as the computer's pointing device, and thus may receive drag, scroll, and flick gestures similar to those implemented on computing devices equipped with a touch screen display and described above. A laptop computer 800 will typically include a processor 811 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 811. The computer 800 may also include a floppy disc drive 814 and a compact disc (CD) drive 815 coupled to the processor 811. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be used in conjunction with the various aspects.

Figure 9:
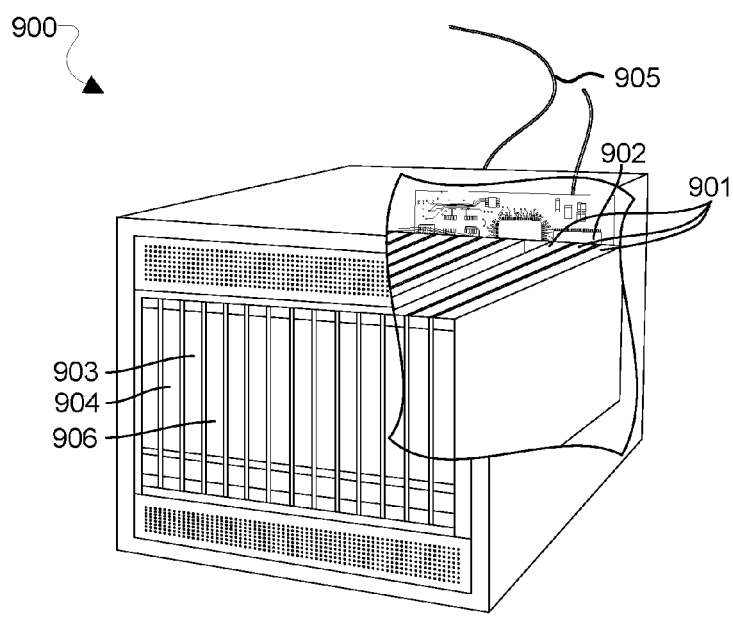
FIG. 9 is component block diagram illustrating an example server suitable for use with the various aspects.

The various aspects (including, but not limited to, aspects described above with reference to FIGS. 1-6) may also be implemented in fixed computing systems, such as any of a variety of commercially available servers. An example server 900 is illustrated in FIG. 9. Such a server 900 typically includes one or more multi-core processor assemblies 901 coupled to volatile memory 902 and a large capacity nonvolatile memory, such as a disk drive 904. As illustrated in FIG. 9, multi-core processor assemblies 901 may be added to the server 900 by inserting them into the racks of the assembly. The server 900 may also include a floppy disc drive, compact disc (CD) or digital versatile disc (DVD) disc drive 906 coupled to the processor 901. The server 900 may also include network access ports 903 coupled to the multi-core processor assemblies 901 for establishing network interface connections with a network 905, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and aspects without departing from the scope of the claims. Thus, the present disclosure is not intended to be limited to the aspects and aspects described herein, but is to be accorded the widest scope consistent with the following claims and the principles and novel features disclosed herein.

What is claimed is:

1. A method of distributive virtual memory (DVM) pre-emptive responding on a computing device, comprising:

receiving a DVM message broadcast from a first DVM source in a DVM message interceptor prior to delivery of the DVM message to a DVM destination;
determining based on a content of the DVM message whether a preemptive DVM message response should be sent by the DVM message interceptor;
generating the preemptive DVM message in response to determining that a preemptive DVM message response should be sent by the DVM message interceptor; and
sending the preemptive DVM message response from the DVM message interceptor to the first DVM source.

2. The method of claim 1, further comprising enabling the broadcast DVM message to reach the DVM destination in response to determining that a preemptive DVM message response should not be sent by the DVM message interceptor.

3. The method of claim 1, wherein the DVM destination is a memory management unit and the DVM message interceptor is positioned within a DVM system to intercept the DVM message before the DVM message reaches the memory management unit.

4. The method of claim 1, further comprising preventing the DVM destination from receiving the broadcast DVM message in response to determining that a preemptive DVM message response should be sent by the DVM message interceptor.

5. The method of claim 1, wherein determining based on a content of the DVM message whether a preemptive DVM message response should be sent by the DVM message interceptor comprises:
comparing data obtained from the broadcast DVM message with corresponding data in at least one of a white-list and a black-list; and
determining whether a preemptive DVM message response should be sent by the DVM message interceptor based upon the comparison.

6. The method of claim 1, wherein determining based on a content of the DVM message whether a preemptive DVM message response should be sent by the DVM message interceptor comprises applying a mask to data obtained from the broadcast DVM message.

7. The method of claim 1, wherein determining based on a content of the DVM message whether a preemptive DVM message response should be sent by the DVM message interceptor comprises comparing data obtained from the broadcast DVM message with a criterion comprising at least one of a virtual memory identifier, a shared process context, a DVM operation, a memory translation stage identifier, and an execution level identifier.

8. A distributive virtual memory (DVM) message interceptor, comprising:
a DVM communication interface;
a preemption identifier communicatively connected to the DVM communication interface; and
a DVM message response generator communicatively connected to the DVM communication interface and the preemption identifier,
wherein:
the DVM communication interface is configured to perform operations comprising:
receiving a DVM message broadcast from a first DVM source prior to delivery of the DVM message to a DVM destination; and
sending a preemptive DVM message response to the first DVM source;
the preemption identifier is configured to perform operations comprising determining based on a content of the DVM message whether a preemptive DVM message response should be sent; and
the DVM message response generator is configured to perform operations comprising generating the preemptive DVM message in response to determining that a preemptive DVM message response should be sent.

9. The DVM message interceptor of claim 8, wherein the DVM communication interface is configured to perform operations further comprising enabling the broadcast DVM message to reach the DVM destination in response to determining that a preemptive DVM message response should not be sent.

10. The DVM message interceptor of claim 8, wherein the DVM destination is a memory management unit and the DVM message interceptor is positioned within a DVM system downstream from a DVM source issuing the DVM message and upstream from the memory management unit to intercept the DVM message before the DVM message reaches the memory management unit.

11. The DVM message interceptor of claim 8, wherein the preemption identifier is configured to perform operations further comprising preventing the DVM destination from receiving the broadcast DVM message in response to determining that a preemptive DVM message response should be sent.

12. The DVM message interceptor of claim 8, wherein the preemption identifier is configured to perform operations such that determining based on a content of the DVM message whether a preemptive DVM message response should be sent comprises:
comparing data obtained from the broadcast DVM message with corresponding data in at least one of a white-list and a black-list; and
determining whether a preemptive DVM message response should be sent based upon the comparison.

13. The DVM message interceptor of claim 8, wherein the preemption identifier is configured to perform operations such that determining based on a content of the DVM message whether a preemptive DVM message response should be sent comprises applying a mask to data obtained from the broadcast DVM message.

14. The DVM message interceptor of claim 8, wherein the preemption identifier is configured to perform operations such that determining based on a content of the DVM message whether a preemptive DVM message response should be sent comprises comparing data obtained from the broadcast DVM message with a criterion comprising at least one of a virtual memory identifier, a shared process context, a DVM operation, a memory translation stage identifier, and an execution level identifier.

15. A distributive virtual memory (DVM) message interceptor, comprising:
means for receiving a DVM message broadcast from a first DVM source in a DVM message interceptor prior to delivery of the DVM message to a DVM destination;
means for determining based on a content of the DVM message whether a preemptive DVM message response should be sent;
means for generating the preemptive DVM message in response to determining that a preemptive DVM message response should be sent; and
means for sending the preemptive DVM message response to the first DVM source.

16. The DVM message interceptor of claim 15, further comprising means for enabling the broadcast DVM message to reach the DVM destination in response to determining that a preemptive DVM message response should not be sent.

17. The DVM message interceptor of claim 15, wherein the DVM destination is a memory management unit and the DVM message interceptor further comprising means to intercept the DVM message before the DVM message reaches the memory management unit.

18. The DVM message interceptor of claim 15, further comprising means for preventing the DVM destination from receiving the broadcast DVM message in response to determining that a preemptive DVM message response should be sent.

19. The DVM message interceptor of claim 15, wherein means for determining based on a content of the DVM message whether a preemptive DVM message response should be sent comprises:
   means for comparing data obtained from the broadcast DVM message with corresponding data in at least one of a white-list and a black-list; and
   means for determining whether a preemptive DVM message response should be sent based upon the comparison.

20. The DVM message interceptor of claim 15, wherein means for determining based on a content of the DVM message whether a preemptive DVM message response should be sent comprises means for applying a mask to data obtained from the broadcast DVM message.

21. The DVM message interceptor of claim 15, wherein means for determining based on a content of the DVM message whether a preemptive DVM message response should be sent comprises means for comparing data obtained from the broadcast DVM message with a criterion comprising at least one of a virtual memory identifier, a shared process context, a DVM operation, a memory translation stage identifier, and an execution level identifier.

22. A non-transitory processor-readable storage medium having stored thereon processor-executable instructions configured to cause a processor of a distributive virtual memory (DVM) message interceptor to perform operations comprising:
   receiving a DVM message broadcast from a first DVM source in a DVM message interceptor prior to delivery of the DVM message to a DVM destination;
   determining based on a content of the DVM message whether a preemptive DVM message response should be sent;
   generating the preemptive DVM message in response to determining that a preemptive DVM message response should be sent; and
   sending the preemptive DVM message response to the first DVM source.

23. The non-transitory processor-readable storage medium of claim 22, wherein the stored processor-executable instructions are configured to cause the processor to perform operations further comprising enabling the broadcast DVM message to reach the DVM destination in response to determining that a preemptive DVM message response should not be sent.

24. The non-transitory processor-readable storage medium of claim 22, wherein the DVM destination is a memory management unit and wherein the stored processor-executable instructions are configured to intercept the DVM message before the DVM message reaches the memory management unit.

25. The non-transitory processor-readable storage medium of claim 22, wherein the stored processor-executable instructions are configured to cause the processor to perform operations further comprising preventing the DVM destination from receiving the broadcast DVM message in response to determining that a preemptive DVM message response should be sent.

26. The non-transitory processor-readable storage medium of claim 22, wherein the stored processor-executable instructions are configured to cause the processor to perform operations such that determining based on a content of the DVM message whether a preemptive DVM message response should be sent comprises:
   comparing data obtained from the broadcast DVM message with corresponding data in at least one of a white-list and a black-list; and
   determining whether a preemptive DVM message response should be sent based upon the comparison.

27. The non-transitory processor-readable storage medium of claim 22, wherein the stored processor-executable instructions are configured to cause the processor to perform operations such that determining based on a content of the DVM message whether a preemptive DVM message response should be sent comprises applying a mask to data obtained from the broadcast DVM message.

28. The non-transitory processor-readable storage medium of claim 22, wherein the stored processor-executable instructions are configured to cause the processor to perform operations such that determining based on a content of the DVM message whether a preemptive DVM message response should be sent comprises comparing data obtained from the broadcast DVM message with a criterion comprising at least one of a virtual memory identifier, a shared process context, a DVM operation, a memory translation stage identifier, and an execution level identifier.

* * * * *